(12) United States Patent
Tseng et al.

(10) Patent No.: US 10,560,672 B2
(45) Date of Patent: *Feb. 11, 2020

(54) ELECTRONIC DEVICE AND OBJECT REPRODUCE METHOD THEREOF

(71) Applicant: Compal Electronics, Inc., Taipei (TW)

(72) Inventors: Yu-Hao Tseng, Taipei (TW); Kun-Hsuan Chang, Taipei (TW); Zi-Ping Liu, Taipei (TW); Hsin-Chieh Cheng, Taipei (TW); Ming-Che Weng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 14 days.

This patent is subject to a terminal disclaimer.

(21) Appl. No.: 15/982,716

(22) Filed: May 17, 2018

(65) Prior Publication Data

US 2019/0297307 A1 Sep. 26, 2019

(30) Foreign Application Priority Data

Mar. 26, 2018 (TW) .............................. 107110239 A

(51) Int. Cl.
*H04N 5/225* (2006.01)
*H04N 9/31* (2006.01)
*G06T 7/70* (2017.01)
*G06T 7/194* (2017.01)

(52) U.S. Cl.
CPC ........... *H04N 9/3185* (2013.01); *G06T 7/194* (2017.01); *G06T 7/70* (2017.01); *H04N 5/2253* (2013.01); *H04N 5/2256* (2013.01)

(58) Field of Classification Search
CPC .. H04N 9/3185; H04N 5/2253; H04N 5/2256; G06T 7/194; G06T 7/70
See application file for complete search history.

(56) References Cited

U.S. PATENT DOCUMENTS

| 9,720,230 B2 * | 8/2017 | Saito | G02B 27/017 |
| 2013/0016070 A1 * | 1/2013 | Starner | G02B 27/017 345/175 |
| 2017/0214896 A1 * | 7/2017 | Goslin | H04N 9/3194 |

FOREIGN PATENT DOCUMENTS

TW I590193 B 7/2017

* cited by examiner

*Primary Examiner* — Padma Haliyur

(57) ABSTRACT

An electronic device and an object reproduce method are provided. In the photographing mode, the camera module is used to capture and store at least one background image within the photographing range and sense whether an external object appears within the photographing range. When the external object is sensed within the photographing range a processor is used to reproduce the external object as a virtual object image. Then, in the projection mode, an image projection module is used to project the virtual object image onto a work plane, and the user is allowed to interact with the virtual object image on the work plane.

18 Claims, 9 Drawing Sheets

US 10,560,672 B2

ELECTRONIC DEVICE AND OBJECT REPRODUCE METHOD THEREOF

FIELD OF THE INVENTION

The present invention relates to object reproduce techniques, and more particularly to an electronic device and an object reproduce method capable of reproducing an external object to produce an image of the external object.

BACKGROUND OF THE INVENTION

With the development of the technology of the projector-related industries, the size of the image projection module can be greatly reduced. Therefore, in recent years, image projection modules have gradually been integrated into other electronic devices such as personal computers. However, the conventional electronic device having the projection function can only allow the user to operate the projected image, but it cannot be linked with the external object and reproduce the external object to generate images about the external object.

SUMMARY OF THE INVENTION

Therefore, an embodiment of the present invention provides an electronic device. The electronic device has a photographing mode and a projection mode, and includes an illumination module, an image projection module, a camera module and at least one processor. The image projection module is pivotally connected to the illumination module. The camera module is disposed on one side of the image projection module. The processor is coupled to the illumination module, the image projection module and the camera module, and is used to reproduce an external object as a virtual object.

Another embodiment of the present invention provides an object reproduce method, which can be performed in the foregoing electronic device. The object reproduce method includes the following steps. First, in the photographing mode, the camera module is used to capture and store at least one background image within the photographing range and sense whether an external object appears within the photographing range. When the external object is sensed within the photographing range a processor is used to reproduce the external object as a virtual object image. Then, in the projection mode, an image projection module is used to project the virtual object image onto a work plane, and the user is allowed to interact with the virtual object image on the work plane.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
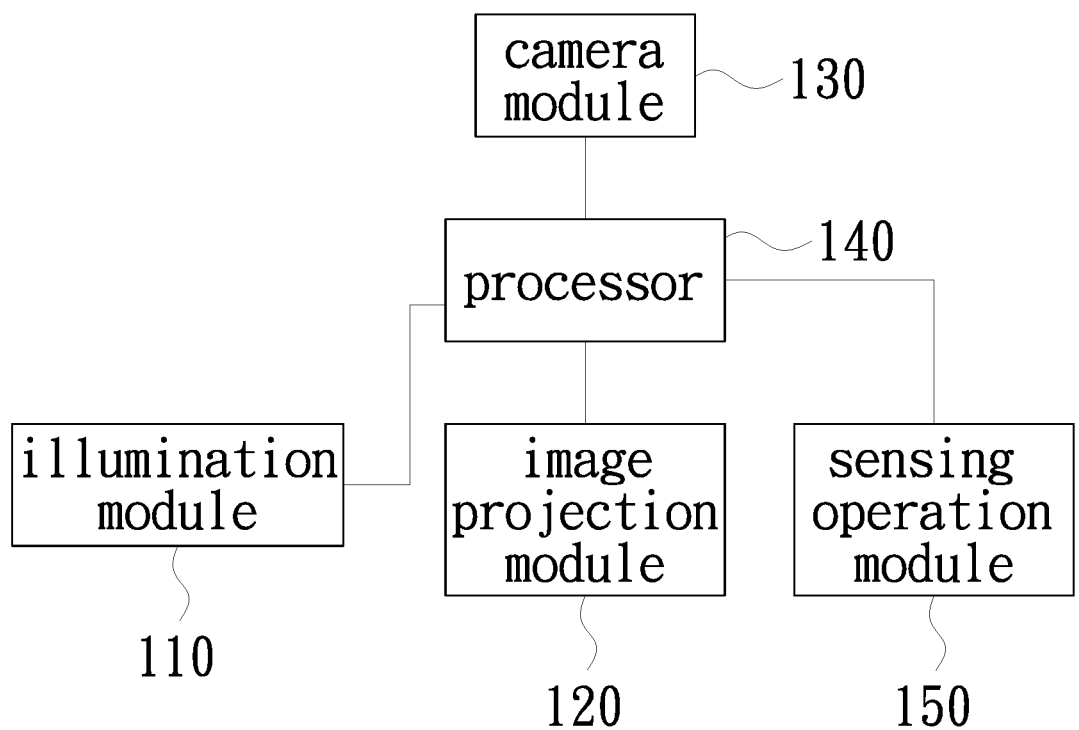
FIG. 1 is a functional block diagram of an electronic device provided by an embodiment of the present invention.

Please refer to FIG. 1 and FIG. 2A to FIG. 2D together. FIG. 1 is a functional block diagram of an electronic device provided by an embodiment of the present invention, and FIG. 2A to FIG. 2D are schematic views of situations when the electronic device of FIG. 1 is in different working modes, respectively. The electronic device 10 mainly has a photographing mode and a projection mode, and includes an illumination module 110, an image projection module 120, a camera module 130 and at least one processor 140. It should be noted that in order to facilitate the following description, the present embodiment only adopts one processor 140 for the illustration, but the present invention it not limited thereto. In addition, the illumination module 110, the image projection module 120, the camera module 130 and the processor 140 may be implemented through a pure hardware circuit, or implemented through a hardware circuit with firmware or software, and the present invention is not limited thereto. In addition, the above elements may be integrated or separated, and the present invention is not limited thereto.

In the present embodiment, the electronic device 10 may be, for example, a personal computer having a projection function, but the present invention is not limited thereto. Therefore, in order to facilitate the configuration of the above-mentioned components into a personal computer, the electronic device 10 must further include a main body 200 (not shown in FIG. 1). Taking FIG. 2A to FIG. 2D as an example, the main body 200 of the present embodiment may have, for example, a base 201 for placing on a work plane C and a support frame 202 connected to the base 201. In the present embodiment, the processor 140 coupled to the illumination module 110, the image projection module 120 and the camera module 130 may be built in the base 201, or may be disposed in an external device (not shown) electrically connected to the electronic device 10, but the present invention is not limited thereto. In order to facilitate the following description, the processor 140 will not be illustrated in FIG. 2A to FIG. 2D.

Further, the illumination module 110 is connected to the support frame 202 and faces the work plane C for providing illumination light to the external object. Specifically, the illumination module 110 is a brightness-adjustable illumination device, and includes, for example, a lamp cover 111 and a light emitting element 112 fixed on the lamp cover 111. In summary, the present invention does not limit the specific implementation of the illumination module 110, and those skilled in the art should be able to perform related designs based on actual needs or applications. The image projection module 120 is pivotally connected to the lamp cover 111 and includes, for example, a housing 121, a projection lens 122 and a light emitting element (not shown) and a display element (not shown) disposed in the housing 121. In practice, the display element is used to convert the illumination beam provided by the light emitting element in the housing 121 into an image beam, and the projection lens 122 is used to project the image beam onto the work plane C.

In addition, the camera module 130 is disposed on one side of the image projection module 120. In the photographing mode, the camera module 130 is used to capture and store a background image within its photographic range and senses whether an external object appears within the photographic range. Taking FIG. 2A as an example, because the camera module 130 is disposed on the lamp cover 111 and includes, for example, at least one RGB camera (not shown), the photographing range includes the working plane C. That is, the background image captured and stored by the camera module 130 may refer to the image on the work plane C. For example, when the electronic device 10 switches to the photographing mode according to the user's operation instruction, the processor 140 enables the camera module 130 to immediately capture and store the image on the current work plane C, or enables the camera module 130 to periodically capture and store image on the work plane C. In summary, the present invention does not limit the specific implementation of the camera module 130 capturing and storing the background image, and it should be understood that the background image herein may refer to an image that does not contain the external object that the user desires to reproduce.

Then, because the user starts to use the electronic device 10 to reproduce an external object, the user can place the external object (for example, the apple in FIG. 2B) within the photographing range of the camera module 130. Taking FIG. 2B as an example, the photographing range of the camera module 130 includes the work plane C, therefore, when the camera module 130 senses an apple (i.e., an external object) on the work plane C, the camera module 130 is used to capture and store the first image containing the apple and part of the background image again. Then, the processor 140 is used to generate a virtual object image based on the first image containing the apple and part of the background image and the background image. In the present embodiment, the camera module 130 may use a background subtraction to determine whether there is an external object within the photographing range. Similarly, in the present embodiment, the processor 140 may also use the background subtraction to perform image subtraction processing on the first image and the background image to generate the virtual object image, but the present invention is not limited thereto. For example, in other embodiments, the processor 140 may generate the virtual object image by using a plurality of image processing mechanisms such as object crop and keystone adjustment on the first image. In summary, since the principle of background subtraction, object crop and keystone adjustment are well known to those of ordinary skill in the art, no redundant detail is to be given herein. It should be understood that the virtual object image herein simply refers to the image of the apple.

Figure 2A:
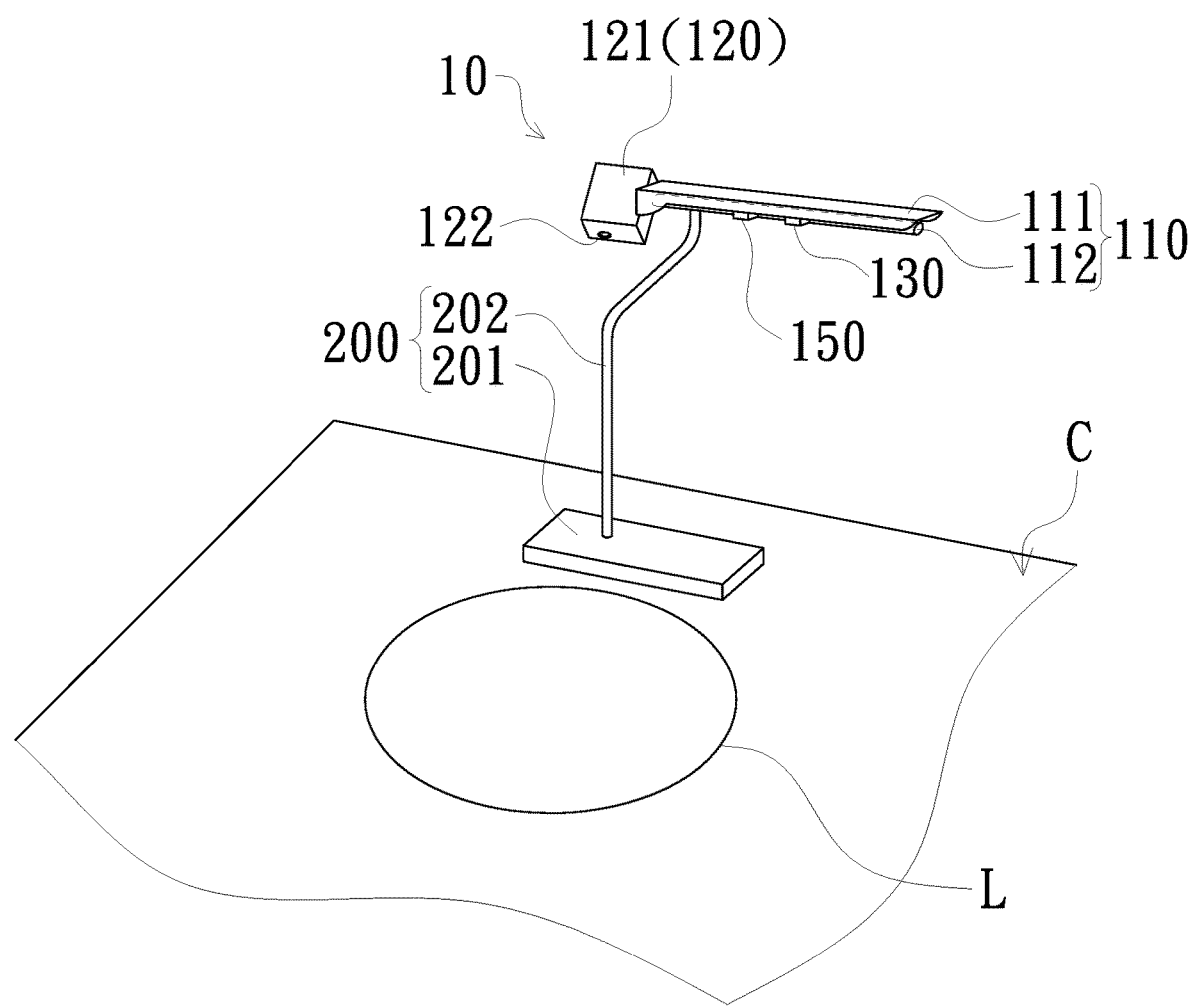
FIG. 2A is a schematic diagram of a situation when the electronic device of FIG. 1 is in a photographing mode.
Figure 2B:
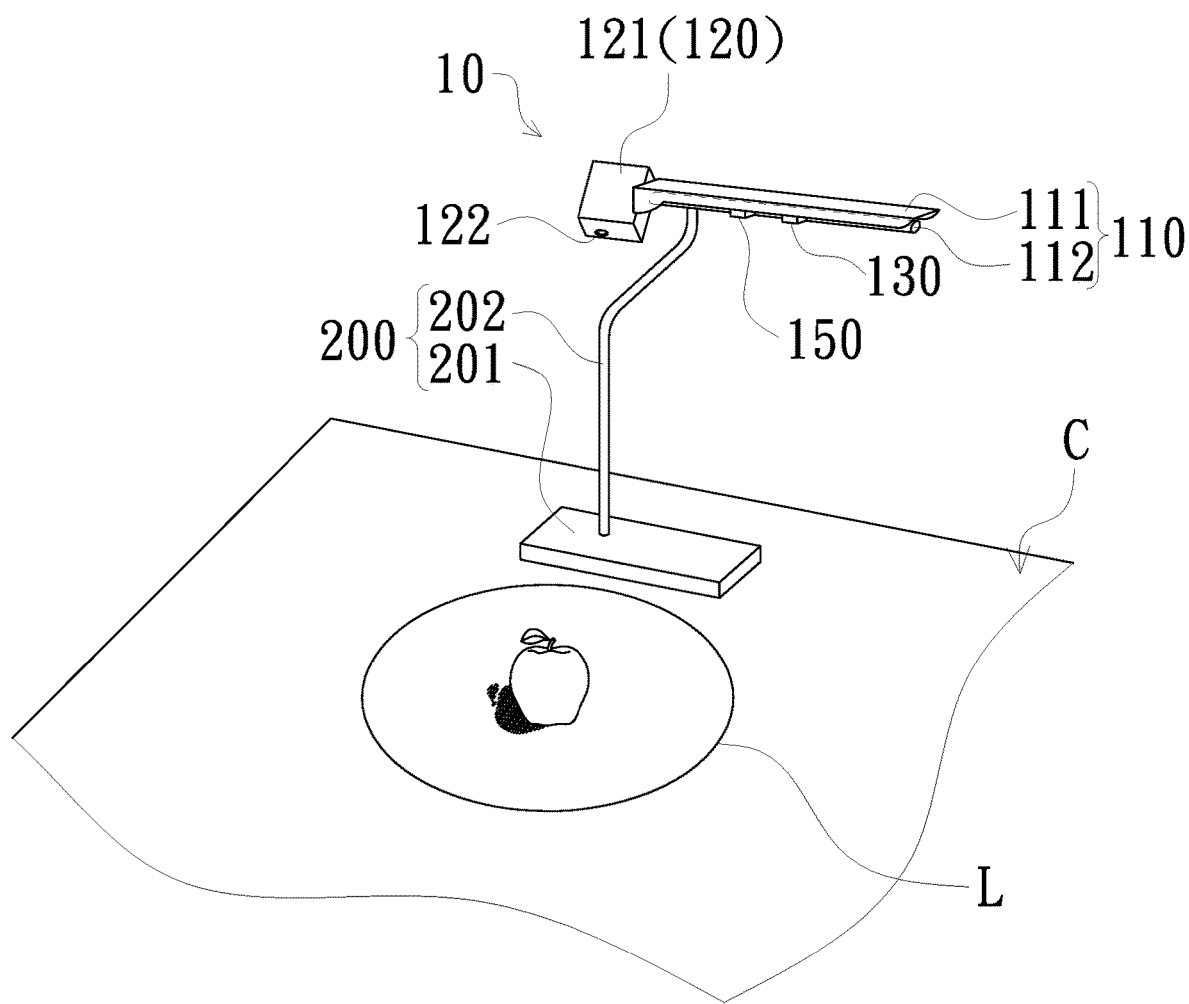
FIG. 2B is a schematic diagram of another situation when the electronic device of FIG. 1 is in a photographing mode.

On the other hand, in order to enable the processor 140 to clearly and completely reproduce only the image of the apple (i.e., the virtual object image), in the photographing mode, the image projection module 120 may be further used to project a preset pattern L onto the work plane C, so as to prompt the user to place the apple in the preset pattern L, so that the camera module 130 can obtain the first image containing the whole image of the apple. Similarly, in the photographing mode, the processor 140 may enable the illumination module 110 to provide illumination light to the external object so as to achieve the effect of light complement. It should be noted that, in order to highlight that the apple in FIG. 2B is a real object, the apple in FIG. 2B contains a shadow; however, it should be understood that the apple in FIG. 2B would no longer have the shadow in the present embodiment after the illumination module 110 has been used to supplement light (i.e., with sufficient light). In addition, according to the teachings of the above contents, those skilled in the art should also understand that after the camera module 130 senses the presence of an external object within its photographic range, the camera module 130 may be further used to sense and determine whether the position of the external object is stable, and the camera module 130 again captures and stores the first image containing the external object and part of the background image until the position of the external object is determined to be stable. In practice, the camera module 130 may use the imaging center offset to determine whether the position of the external object is stable, but the present invention is not limited thereto. For example, the camera module 130 may determine whether there is a change in the center position of the first image within a preset time. If there is a change, an offset is generated and which means "unstable"; and if there is no change, there is no offset and which means "stable." In summary, the specific implementation manners used herein are only examples, and the outline of the preset pattern L in FIG. 2A and FIG. 2B is also merely for illustration, and the present invention is not limited thereto.

Figure 2C:
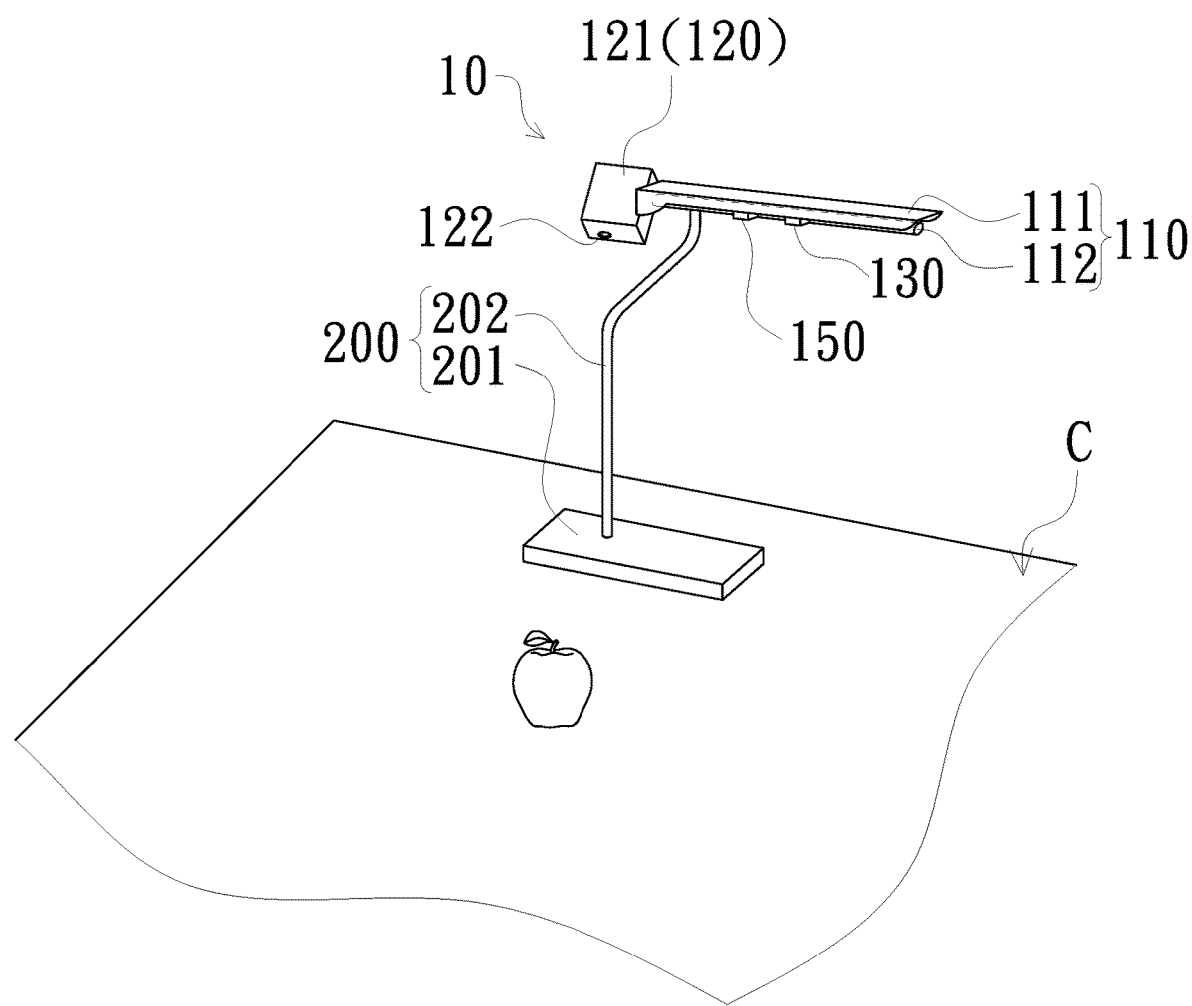
FIG. 2C is a schematic diagram of a situation when the electronic device of FIG. 1 is in a projection mode.

Then, taking FIG. 2C as an example. In the projection mode, the processor 140 enables the image projection module 120 to project the virtual object image onto the work plane C and allows the user to interact with virtual object images on work plane C. However, in order to allow the user to directly interact with the virtual object image on the work plane C, the electronic device 10 of the present embodiment may further include the sensing operation module 150 as an input interface of the electronic device 10. The sensing operation module 150 is coupled to the processor 140. In the projection mode, the sensing operation module 150 is used to sense the user's interaction with the virtual object image. It should be understood that the so-called interaction herein may include, for example, zooming in, zooming out, moving, single-clicking, double-clicking or cropping the virtual object image, but the present invention is not limited thereto. In practice, the sensing operation module 150 may be, for example, an infrared sensing operation module, a capacitance sensing operation module, a resistance sensing operation module or an ultrasound sensing operation module, and it is disposed on the illumination module 110 as shown in FIG. 2C or other suitable location. In summary, the present invention does not limit the specific implementation of the sensing operation module 150, and since the sensing operation module 150 is already known to those of ordinary skill in the art, no redundant detail is to be given herein.

In addition, as described above, the electronic device 10 can actively switch to the photographing mode according to the user's operation instructions, that is, the processor 140 can determine to switch the electronic device 10 to the photographing mode according to the user's operation instructions. Therefore, after the processor 140 generates a virtual object image, the processor 140 can also determine to switch the electronic device 10 to the projection mode from the photographing mode. It should be noted that the above operation instruction may be obtained by a user pressing a physical or virtual button (not shown) on the electronic device 10, or may be obtained by the user performing gesture operation on the sensing operation module 150. In summary, the present invention does not limit the specific implementation of the operation instructions, and those skilled in the art should be able to perform related designs based on actual needs or applications.

However, in order to avoid misjudgment on the gesture control, in the present embodiment, when the electronic device 10 is in the photographing mode, the sensing operation module 150 can be turned on but does not function. Or, in other embodiments, when the processor 140 decides to switch the electronic device 10 to the photographing mode, the processor 140 may directly disable the sensing operation module 150 so that the sensing operation module 150 is in the shutdown state until the photographing mode is over. Similarly, when the processor 140 decides to switch the electronic device 10 to the projection mode from the photographing mode, the processor 140 may directly disable the camera module 130 so that the camera module 130 is in the shutdown state, so as to avoid misuse by the user. Or, in the present embodiment, after the image projection module 120 projects the virtual object image onto the work plane C, the camera module 130 may also be used to sense and determine whether the external object disappears within the photographing range and the camera module 130 will be in the shutdown state until it is determined that the external object disappears within the photographing range. In practice, the camera module 130 may also use the background subtraction to determine whether the external object disappears within the photographing range but the present invention is not limited thereto. In addition, in the present embodiment, when the camera module 130 determines that the external object disappears within the photographing range the processor 140 may enable the illumination module 110 to reduce the brightness of the illumination light, thereby reducing the tiredness of the user's eyes or even the affection or damage on the eyesight. In summary, the implementation manners adopted above are only examples, and the present invention is not limited thereto. Those skilled in the art should be able to perform related designs based on actual needs or applications.

Figure 2D:
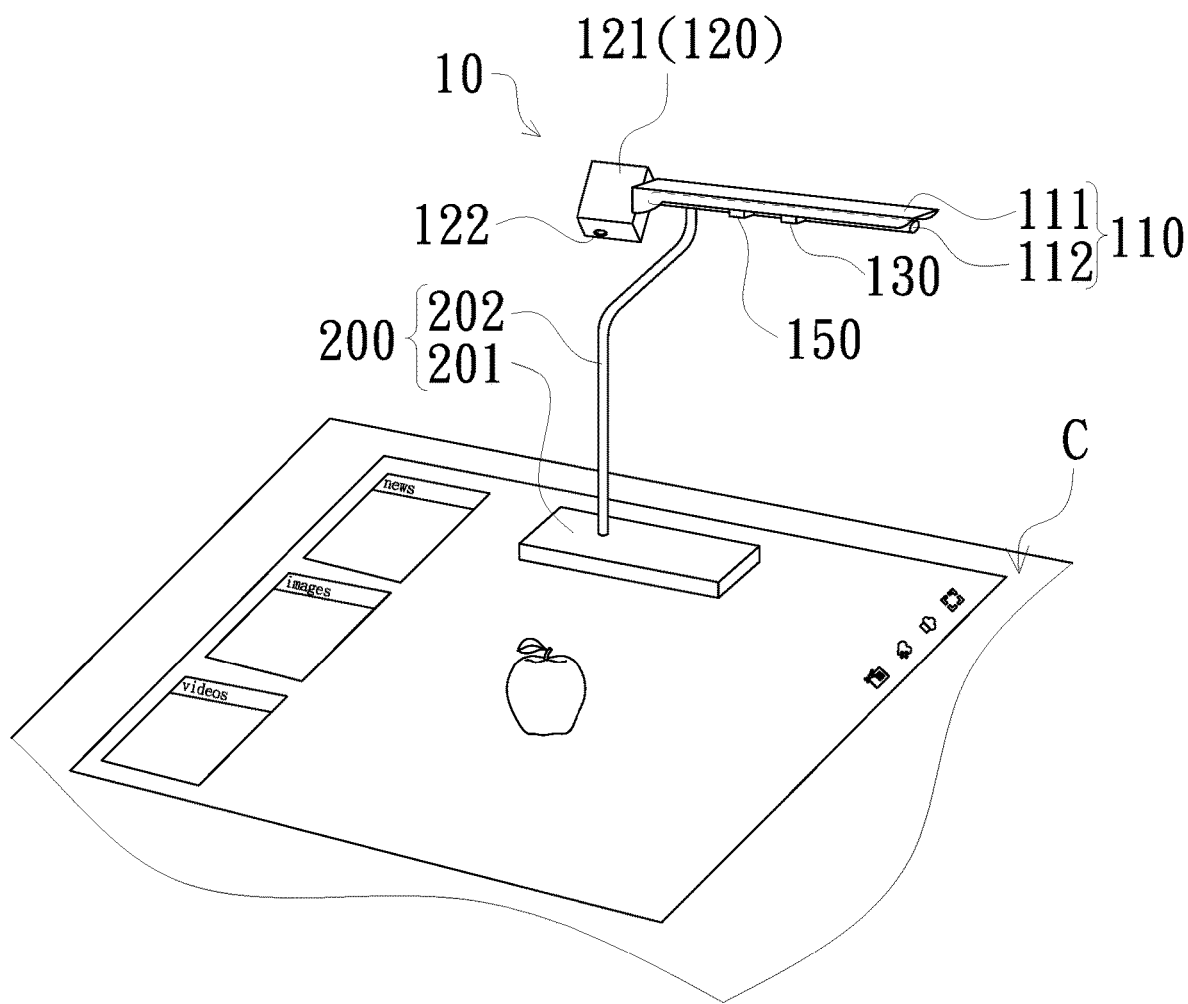
FIG. 2D is a schematic diagram of another situation when the electronic device of FIG. 1 is in a projection mode.

Further, in the present embodiment, after the processor 140 generates a virtual object image, the electronic device 10 may not only store the virtual object image but may also upload the virtual object image to a cloud database (not shown). The cloud database is used to store at least one information tag associated with the aforementioned virtual object image and perform data transmission with the electronic device 10 via at least one communication protocol. Therefore, after the electronic device 10 uploads the virtual object image, the electronic device 10 may further download the information tag associated with the virtual object image from the cloud database and display a corresponding graphical user interface according to the information tag in the projection mode, thereby allowing the user to obtain relevant information about the external object without via other channels and satisfying the user's demand for knowledge of the external object, as shown in FIG. 2D. The so-called information tag may include, for example, nutritional components, cooking recipes, advertisements or purchase websites of the external object (e.g., apple), but the present invention is not limited thereto. Or, in other embodiments, the electronic device 10 may directly upload the first image containing the external object and part of the background image to the cloud database and download at least one information tag associated with the first image from the cloud database. In summary, the implementation manners adopted above are only examples, and the present invention is not limited thereto. Those skilled in the art should be able to perform related designs based on actual needs or applications.

Figure 3A:
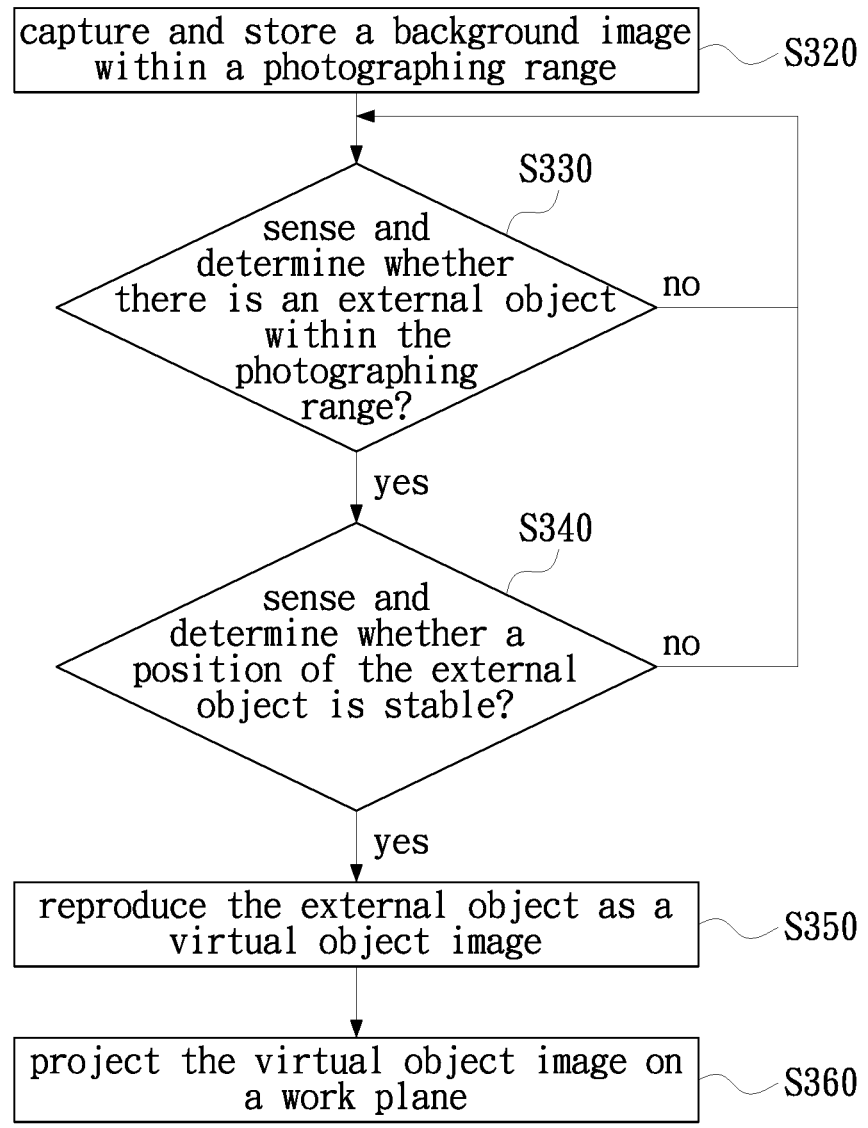
FIG. 3A is a schematic flowchart of an object reproduce method according to an embodiment of the present invention.

Finally, in order to further explain the object reproduce process of the foregoing electronic device 10, the present invention further provides an embodiment of an object reproduce method. Referring to FIG. 3A. FIG. 3A is a schematic diagram of a process of an object reproduce method according to an embodiment of the present invention. It should be noted that the object reproduce method of FIG. 3A may be performed in the electronic device 10 shown in FIG. 1 to FIG. 2D, so please also refer to FIG. 1 to FIG. 2D for better understanding, but the object reproduce method of FIG. 3A is not limited to be only performed in the electronic device 10 of FIG. 1 to FIG. 2D. In addition, since the detailed step flow is as described in the foregoing embodiment, it is merely an overview and no redundant detail is to be given herein.

As shown in FIG. 3A, first, in step S320, when in a photographing mode, a camera module is used to capture and store a background image within its photographing range. Thereafter, in step S330, the camera module is used to sense and determine whether there is an external object within the photographing range and step S340 is not performed until it is determined that there is an external object within the photographing range. In step S340, the camera module is used to sense and determine whether the position of the external object is stable. If the position of the external object is not stable, the process returns to step S330; alternatively, if the position of the external object is stable, step S350 is performed. In step S350, a processor is used to reproduce the external object as a virtual object image. Thereafter, in step S360, when in a projection mode, an image projection module is used to project the virtual object image onto a work plane and allow a user to interact with the virtual object image on the work plane.

Figure 3B:
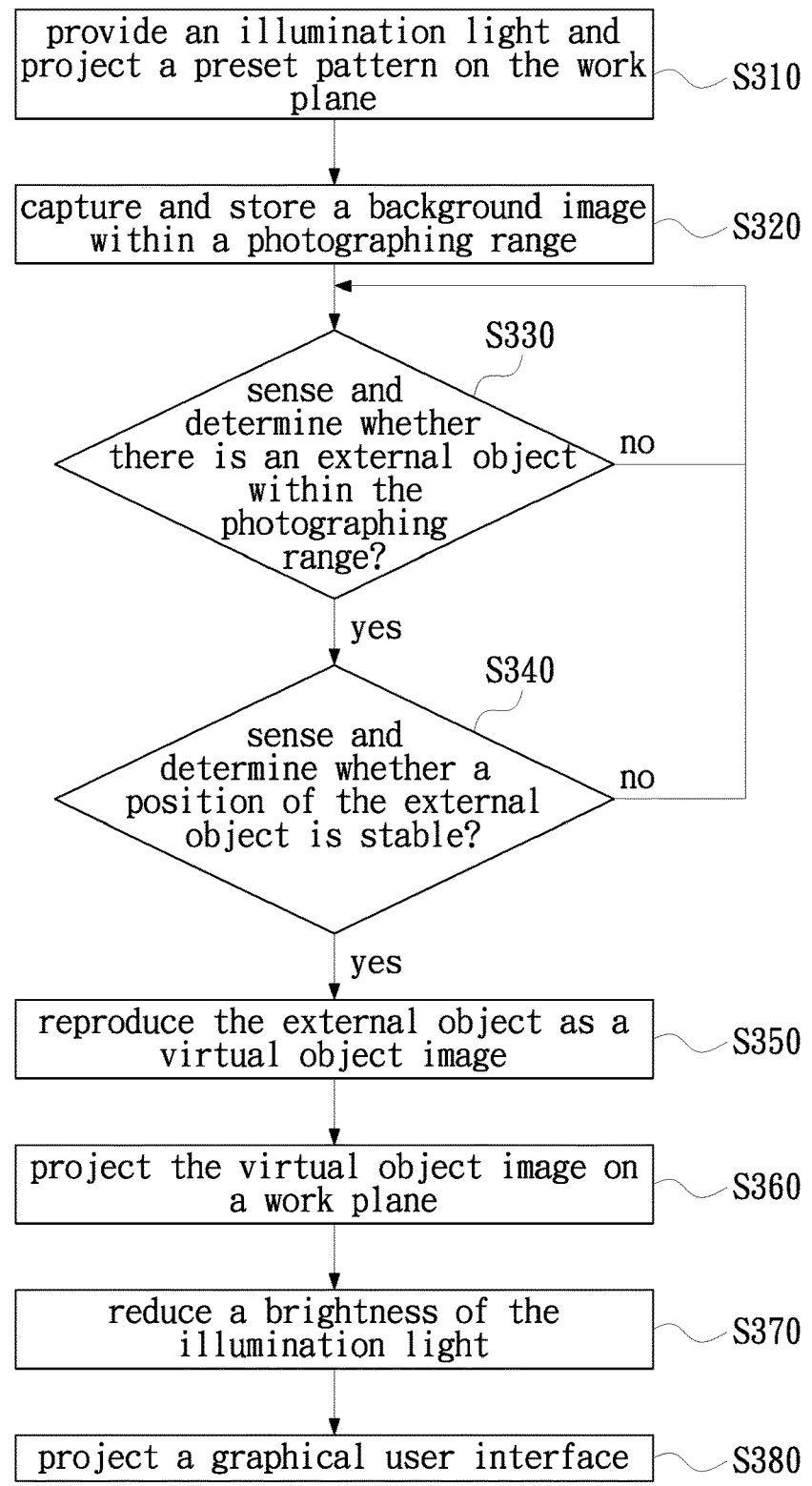
FIG. 3B is a schematic flowchart of an object reproduce method according to another embodiment of the present invention.

Further, the step S350 of the present embodiment may include: capturing and storing a shape outline of the external object, calculating an area within the shape outline, and finding out the best match for a virtual object image in a plurality of virtual object images according to the shape outline and the area thereof. However, the present invention does not limit the specific implementation of step S350, and those skilled in the art should be able to perform related designs based on actual needs or applications. In addition, as described in the foregoing, the electronic device of the present embodiment may actively switch to the photographing mode according to the user's operation instruction, therefore, in step S350, after the processor generates the virtual object image, the processor can also decide to switch the electronic device to the projection mode from the photographing mode. However, in order to allow the processor to clearly and completely reproduce the image of the external object (i.e., the virtual object image), please refer to FIG. 3B together. FIG. 3B is a flow chart of an object reproduce method provided by another embodiment of the present invention. It should be noted that the object reproduce method of FIG. 3B may also be performed in the electronic device 10 shown in FIG. 1 to FIG. 2D, but the present invention does not limit that the object reproduce method of FIG. 3B to only be performed in the electronic device 10 of FIG. 1 to FIG. 2D. In addition, the flow steps in FIG. 3B that are the same as or similar to those in FIG. 3A are denoted by the same or similar figure numbers, and no redundant detail is to be given herein.

Compared to the object reproduce method of FIG. 3A, the object reproduce method of FIG. 3B further includes step S310, step S370 and step S380. First, in step S310, when in the photographing mode, an illumination module is used to provide illumination light to the external object so as to achieve the effect of light complement, and an image projection module is used to project a preset pattern onto the work plane, so as to prompt the user to place the desired external object in the preset pattern. In addition, in step S370 after step S360, the illumination module is set to reduce the brightness of the aforementioned illumination light, thereby reducing the tiredness of the user's eyes or even the affection or damage on the eyesight. In step S380, the electronic device is used to project and display a graphical user interface.

Figure 4A:
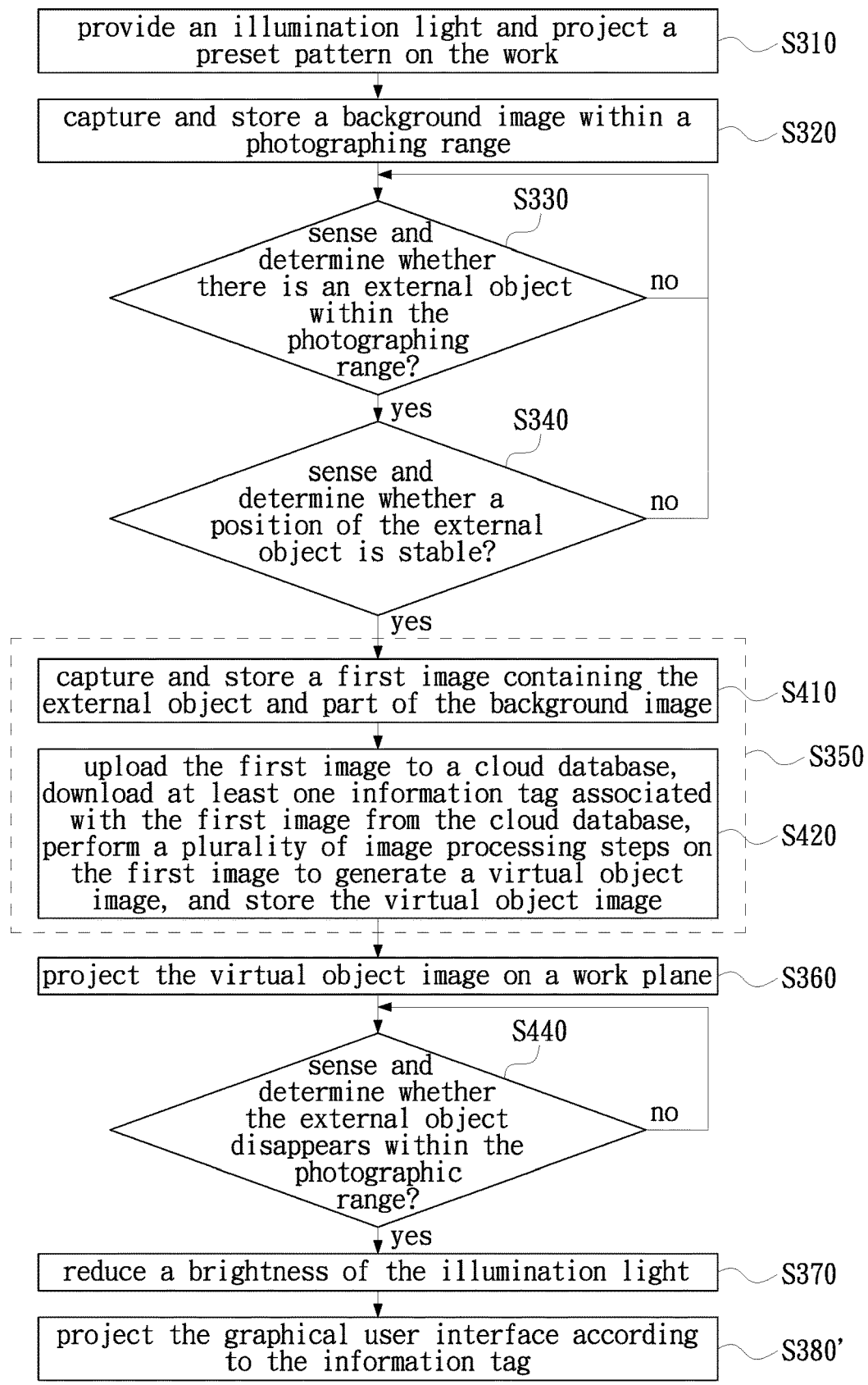
FIG. 4A is a schematic flowchart of an object reproduce method according to another embodiment of the present invention.
Figure 4B:
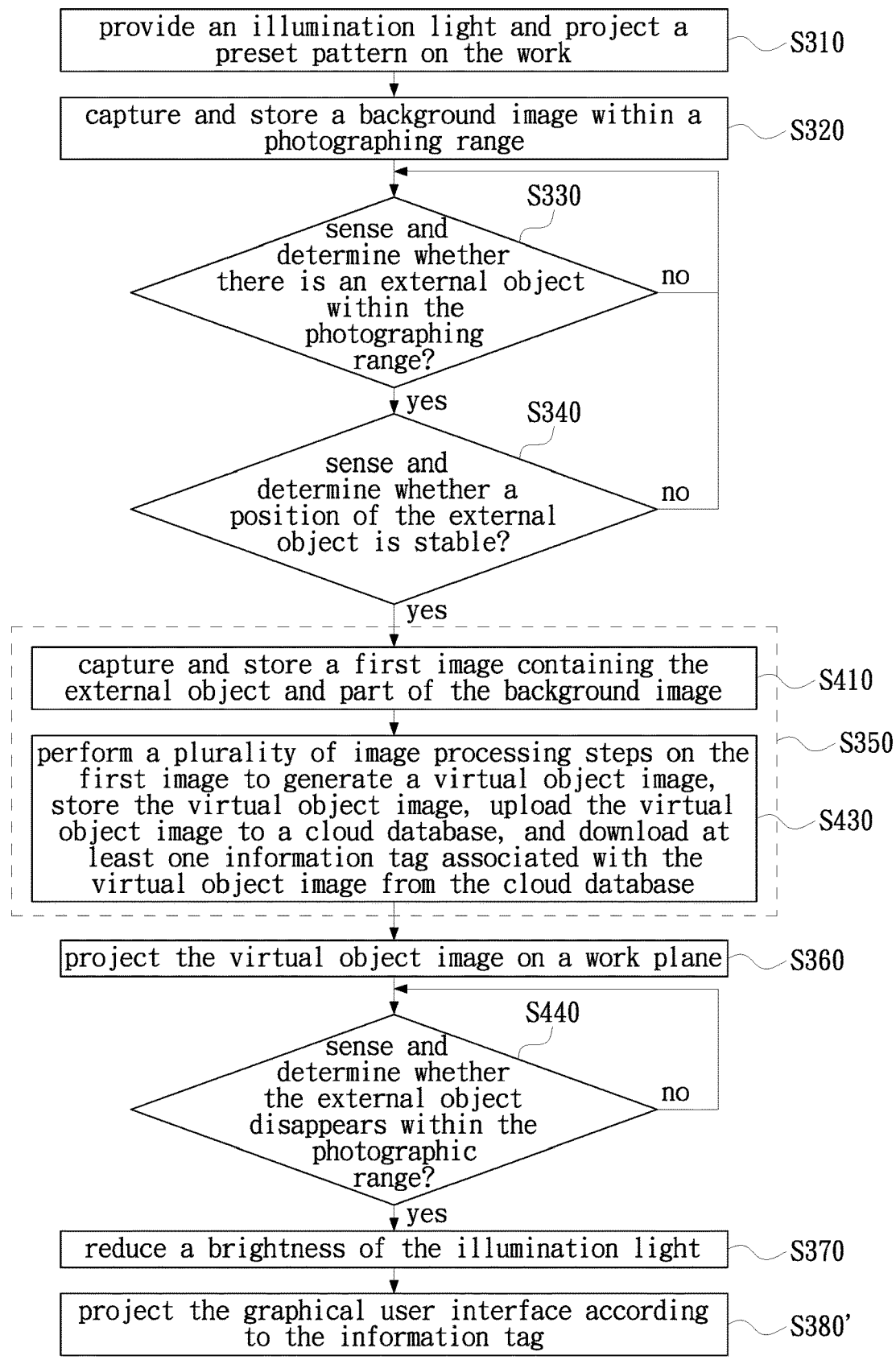
FIG. 4B is a schematic flowchart of an object reproduce method according to another embodiment of the present invention.

Similarly, if it is considered that the electronic device of the present embodiment can upload an image to a cloud database and download at least one information tag associated with the image from the cloud database, please refer to FIG. 4A and FIG. 4B. FIG. 4A and FIG. 4B are respectively schematic flowcharts of an object reproduce method according to another embodiment of the present invention. It should be noted that the object reproduce method of FIG. 4A and FIG. 4B may also be performed in the electronic device 10 shown in FIG. 1 to FIG. 2D, but the object reproduce method of FIG. 4A and FIG. 4B is not limited to be only performed in the electronic device 10 of FIG. 1 to FIG. 2D. In addition, the flow steps in FIG. 4A that are the same as or similar to those in FIG. 3B are denoted by the same or similar figure numbers, the flow steps in FIG. 4B that are the same as or similar to those in FIG. 4A are denoted by the same or similar figure numbers, and no redundant detail is to be given herein.

Compared to step S350 of FIG. 3B, step S350 of FIG. 4A further includes steps S410 and S420. Step S410 includes: capturing and storing the first image containing the external object and part of the background image. Step S420 includes: uploading the first image to a cloud database, downloading at least one information tag associated with the first image from the cloud database, generating a virtual object image by using a plurality of image processing on the first image, and storing the virtual object image. Similarly, compared to step S350 of FIG. 3B, step S350 of FIG. 4B further includes steps S410 and S430. Step S430 includes: generating a virtual object image by using a plurality of image processing on the first image, storing the virtual object image, uploading the virtual object image to the cloud database, and downloading at least one information tag associated with the virtual object image. In summary, the implementation manners adopted above are only examples, and the present invention is not limited thereto. Those skilled in the art should be able to perform related designs based on actual needs or applications. In addition, as shown in FIG. 4A and FIG. 4B, in step S440 after step S360, the camera module is used to sense and determine whether the external object disappears within the photographing range and step S370 is not performed until when the external object is determined to disappear in the photographing range. In step S380' of FIG. 4A and FIG. 4B, the electronic device is used to project and display the graphical user interface based on the information tag.

In summary, the embodiments of the present invention provide an electronic device and an object reproduce method. In the photographing mode, the camera module is used to capture at least one background image within the photographing range and the first image containing the external object and part of the background image and the background subtraction is used to obtain the virtual object image with only the external object. Then in the projection mode, the image projection module is used to project the virtual object image onto the work plane. In addition, the electronic device and its object reproduce method according to the embodiments of the present invention not only project the virtual object image of the external object, but may also allow the user to interact with the virtual object image on the work plane and also project other relevant information about the external object on the work plane, thereby increasing the interaction between the user and the external object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device has a photographing mode and a projection mode, comprising:
    a main body, having a base for placing on a work plane and a support frame connected to the base;
    an illumination assembly, connected to the support frame, wherein the illumination assembly is capable of providing an illumination light to an external object placed on the work plane in the photographing mode;
    an image projection assembly, pivotally connected to the illumination assembly;
    a camera assembly, disposed on one side of the image projection assembly, wherein the camera assembly is capable of capturing an image of the external object placed on the work plane in the photographing mode; and
    at least one processor, coupled to the illumination assembly, the image projection assembly and the camera assembly, for reproducing the external object as a virtual object, and capable of enabling the image projection assembly to project the virtual object image onto the work plane for an interactive operation.

2. The electronic device according to claim 1, wherein the camera assembly is further for capturing and storing a background image within a photographing range of the camera assembly and sensing whether the external object appears within the photographing range.

3. The electronic device according to claim 2, wherein when the camera assembly senses that the external object appears within the photographing range, the illumination assembly is used to provide the illumination light to the external object.

4. The electronic device according to claim 3, wherein the processor is used to generate a virtual object image according to a first image and the background image.

5. The electronic device according to claim 4, further comprising:

a sensing operation assembly, coupled to the processor, for sensing the interactive operation performed by a user on the virtual object image.

6. The electronic device according to claim 5, wherein the sensing operation assembly is an infrared sensing operation assembly, a capacitance sensing operation assembly, a resistance sensing operation assembly or an ultrasound sensing operation assembly.

7. An object reproduce method, comprising steps of:
capturing and storing a background image within a photographic range;
sensing and determining whether there is an external object within the photographing range;
when the external object appears in the photographing range sensing and determining whether a position of the external object is stable;
when the position of the external object is stable,
capturing and storing a shape outline of the external object or a first image comprising the external object and part of the background image;
performing at least one image processing steps on the shape outline of the external object or the first image to generate a virtual object image; and
projecting the virtual object image;
when the position of the external object is not stable,
returning back to the step of sensing, and
determining whether there is the external object within the photographing range; and
when the external object does not appear within the photographing range, returning back to the step of sensing and determining whether there is the external object within the photographing range.

8. The object reproduce method according to claim 7, wherein the step of sensing and determining whether there is the external object within the photographing range comprises a step of:
using a background subtraction to perform an image subtraction process.

9. The object reproduce method according to claim 7, wherein the step of sensing and determining whether a position of the external object is stable comprises a step of:
performing an imaging center offset for determination.

10. The object reproduce method according to claim 7, wherein when the position of the external object is stable, the object reproduce method further comprises steps of:
calculating an area within the shape outline; and
finding out the best match for the virtual object image in a plurality of virtual object images according to the shape outline and the area thereof.

11. The object reproduce method according to claim 7, further comprising a step of:
providing an illumination light.

12. The object reproduce method according to claim 7, further comprising a step of:
projecting a preset pattern.

13. The object reproduce method according to claim 7, further comprising steps of:
sensing and determining whether the external object disappears within the photographic range; and
when the external object does not disappear within the photographing range returning back to the step of sensing and determining whether the external object disappears within the photographic range.

14. The object reproduce method according to claim 7, wherein the step of sensing and determining whether the external object disappears within the photographic range comprises a step of:
performing a background subtraction for determination.

15. An object reproduce method, comprising steps of:
capturing and storing a background image within a photographic range;
sensing and determining whether there is an external object within the photographing range;
when the external object appears in the photographing range sensing and determining whether a position of the external object is stable;
when the position of the external object is stable,
capturing and storing a first image comprising the external object and part of the background image;
uploading the first image to a cloud database;
downloading at least one information tag associated with the first image from the cloud database;
performing a plurality of image processing steps on the first image to generate a virtual object image; and
storing the virtual object image
when the position of the external object is not stable,
returning back to the step of sensing, and
determining whether there is the external object within the photographing range; and
when the external object does not appear within the photographing range, returning back to the step of sensing and determining whether there is the external object within the photographing range.

16. The object reproduce method according to claim 15, wherein the image processing steps comprise an object crop and a keystone adjustment.

17. The object reproduce method according to claim 15, wherein when the external object disappears within the photographing range the object reproduce method further comprises steps of:
reducing a brightness of the illumination light; and
projecting a corresponding graphical user interface according to the information tag.

18. An object reproduce method, comprising steps of:
capturing and storing a background image within a photographic range;
sensing and determining whether there is an external object within the photographing range;
when the external object appears in the photographing range sensing and determining whether a position of the external object is stable;
when the position of the external object is stable,
capturing and storing a first image comprising the external object and part of the background image;
performing a plurality of image processing steps on the first image to generate a virtual object image;
storing the virtual object image;
uploading the virtual object image to a cloud database; and
downloading at least one information tag associated with the virtual object image from the cloud database;
when the position of the external object is not stable,
returning back to the step of sensing, and
determining whether there is the external object within the photographing range; and
when the external object does not appear within the photographing range, returning back to the step of sensing and determining whether there is the external object within the photographing range.

* * * * *